United States Patent [19]

Drnevich et al.

[11] Patent Number: 5,775,128

[45] Date of Patent: Jul. 7, 1998

[54] PROCESS FOR PRODUCING AMMONIA AND RECOVERING ARGON USING LOW PURITY OXYGEN

[75] Inventors: Raymond Francis Drnevich, Clarence Center; Theodore Fringelin Fisher, Amherst, both of N.Y.

[73] Assignee: Praxair Technology, Inc., Danbury, Conn.

[21] Appl. No.: 850,697

[22] Filed: May 2, 1997

[51] Int. Cl.$^6$ .................................................. F25J 3/04
[52] U.S. Cl. ........................ 62/632; 62/924; 62/934
[58] Field of Search ..................... 62/632, 924, 934

[56] References Cited

U.S. PATENT DOCUMENTS

| | | | |
|---|---|---|---|
| 4,266,957 | 5/1981 | Isalski | 62/934 |
| 4,380,461 | 4/1983 | Haslam et al. | 62/934 |
| 4,473,385 | 9/1984 | Fabian et al. | 62/934 |
| 4,544,390 | 10/1985 | Traficante | 62/934 |
| 4,549,890 | 10/1985 | Bligh | 62/934 |
| 4,687,498 | 8/1987 | MacLean et al. | 62/17 |
| 4,689,062 | 8/1987 | MacLean et al. | 62/18 |
| 4,750,925 | 6/1988 | MacLean et al. | 62/18 |
| 4,752,311 | 6/1988 | MacLean et al. | 62/18 |
| 4,805,414 | 2/1989 | Fisher | 62/28 |
| 5,100,447 | 3/1992 | Krishnamurthy et al. | 62/22 |

OTHER PUBLICATIONS

Cryogenic Processes and Machinery, vol. ed. by L.A. Wenzel, in AIChE Symposium Series, vol. 89, No. 294, 1993, Hwang et al., "Cryogenic Argon Recovery from Ammonia Plant Gas", pp. 8–13.

Cryogenic Processes and Machinery, vol. ed. by L.A. Wenzel, in AIChE Symposium Series, vol. 89, No. 294, 1993, Krishnamurthy, "Evaluation of Competing Technologies for Hydrogen and Argon Recovery from Ammonia Plant Purge Gas", pp. 109–114.

*Primary Examiner*—Ronald C. Capossela
*Attorney, Agent, or Firm*—Bernard Lau

[57] ABSTRACT

A process for producing ammonia synthesis gas and recovering argon in conjunction with a low-purity oxygen separating unit.

20 Claims, 2 Drawing Sheets

PROCESS FOR PRODUCING AMMONIA AND RECOVERING ARGON USING LOW PURITY OXYGEN

FIELD OF THE INVENTION

This invention relates to a process for producing ammonia and recovering argon, and more particularly to a process for producing ammonia and recovering argon using a gas produced from partial oxidation utilizing low purity oxygen.

BACKGROUND OF THE INVENTION

In the past, the oxygen supplied for use in partial oxidation reaction to produce ammonia synthesis gas usually comes from high purity oxygen plant. The resulting oxygen used in many of the partial oxidation systems in the art may range in oxygen purity of higher than 99% oxygen content. Since the cost of purifying an oxygen-containing gas into a high purity oxygen is important in many applications, including the production of ammonia and recovery of argon, commercial application using partial oxidation of highly pure oxygen necessarily incur high cost.

Hydrogen and a higher boiling compound are often used as synthesis gas components for the formation of useful chemical compounds. For example, synthesis gas having hydrogen and nitrogen components in a 3:1 molar ratio is employed to form ammonia.

The production of ammonia synthesis gas generally takes place by two routes: steam reforming or partial oxidation. The first route employs primary steam reforming of natural gas or another low carbon number hydrocarbon, followed by secondary reforming with an oxygen-containing gas, generally air, a step which produces a desirable amount of nitrogen, but also undesirable amount of argon. When this gas is used as synthesis gas in an ammonia production plant, argon and unreacted natural gas (i.e., methane) build up in the recirculating synthesis gas loop, which generally require removal using a purge stream. The purge stream is often processed to reject the argon and methane, and return much of the hydrogen and nitrogen which would otherwise be lost in the purge stream back to the ammonia plant. In some cases, the rejected argon is recovered as a product stream.

A second route for producing ammonia synthesis gas is through partial oxidation with oxygen (rather than air) followed by removal of contaminants using nitrogen. A nitrogen wash unit is often used, wherein the desired nitrogen is also provided. Since high purity oxygen has been used in the past for the partial oxidation step, only a small amount of argon and natural gas need to be rejected from the synthesis gas loop. This requires only a small purge stream, which may not be further processed.

Cryogenic processing is one means which has been employed for the recovery of components from a synthesis gas stream. The cryogenic process employs a first partial condensation step which separates a hydrogen-rich vapor fraction from the remainder of the stream. The purity of the hydrogen which can be produced by this step is limited, since the low temperatures which would be required for complete condensation of higher boiling synthesis gas component would result in freezing of the condensed fraction. The hydrogen-rich vapor might be directly utilized for recycle to the synthesis gas process. However, if high purity hydrogen is required, an additional processing method must be employed. Pressure swing adsorption is an example of such a method.

Various treatments of ammonia plant purge gas, i.e., the treatment of the vent gas from ammonia, synthesis reactor has been disclosed in the art. See, U.S. Pat. Nos. 4,687,498, 4,689,062, 4,752,311, 4,750,925, 4,805,414, and 5,100,447. See also, Cryogenic Processes and Machinery, volume edited by L. A. Wenzel, in AIChE Symposium Series, Vol. 89, No. 294, 1993, Hwang et al., "Cryogenic Argon Recovery from Ammonia Plant Gas", p. 8–13, and Cryogenic Processes and Machinery, volume edited by L. A. Wenzel, in AIChE Symposium Series, Vol. 89, No. 294, 1993, Krishnamurthy, "Evaluation of Competing Technologies for Hydrogen and Argon Recovery from Ammonia Plant Purge Gas", p. 109–114. None of these references is believed to relate to the raw synthesis gas, i.e., the hydrogen and nitrogen mixture with fuel and argon that is upstream of the synthesis reactor, involving the production of synthesis gas, organic fuel and the argon product.

OBJECTS OF THE INVENTION

It is therefore an object of the invention to provide a process to produce ammonia synthesis gas and recover argon using a low purity oxygen.

It is a further object of this invention to employ a cryogenic separation process which uses a unique column arrangement for producing synthesis gas and recovering argon.

SUMMARY OF THE INVENTION

This invention comprises a process for producing ammonia synthesis gas and recovering argon in conjunction with a low purity oxygen separating unit. Several steps are employed. A feed gas comprising at least oxygen, nitrogen and argon is provided into the separating unit to separate the feed gas into at least a low purity oxygen gas and nitrogen. The low purity oxygen gas, which contains a low percentage level concentration of argon, is utilized to partially oxidize a carbonaceous feed stock, thereby generating a hydrogen-rich, argon-containing gas, which also may contain other impurities such as carbon monoxide and methane. Nitrogen is passed into a wash unit comprising a wash column and at least one cryogenic fractional distillation column. The hydrogen-rich, argon-containing gas is washed with at least a portion of the nitrogen in the wash column to produce a rich hydrogen-nitrogen mixture, which is essentially free of the other impurities, and an argon-containing residual liquid. The rich hydrogen-nitrogen mixture is combined with another portion of the nitrogen gas to produce ammonia synthesis gas. The residual liquid is passed into at least one of the distillation column. Argon is then recovered from the distillation column.

In a preferred embodiment the low purity oxygen contains about 50 to 99% oxygen, preferably from 90 to 95% oxygen. Higher oxygen purity generally requires higher capital cost and power consumption to the entire system. The low purity oxygen is further used for partial oxidation of natural gas, a hydrocarbon oil, or coal to produce hydrogen-rich, argon-containing gas, which contains from about 80 to 98% hydrogen. The wash unit comprises least one phase separator and at least one fractional distillation column.

The term "fractional distillation column", as used herein means a distillation of fractionation column or zone, i.e., a contacting column or zone wherein liquid and vapor phase are countercurrently contacted to effect separation of a fluid mixture, as for example, by contacting the vapor and liquid phases on a series of vertically spaced trays or plates mounted within the column or alternatively, on packing elements with which the column is filled. For further discussion of distillation columns, see the Chemical Engineers'

Handbook, Fifth Edition, edited by R. H. Perry and C. H. Chilton, McGraw-Hill Book Company, New York, Section 13, "Distillation" B. D. Smith et al., page 13–30. The Continuous Distillation Process.

The term "indirect heat exchange", as used herein means the bringing of two fluid streams into heat exchange relation without any physical contact or intermixing of fluids with each other.

As used herein, the term "phase separator" refers to a device which separates a material of mixed phase into at least two phases, without changing the composition of the material.

The "wash column" as used in this invention refers to a column using absorption materials with affinity to certain gaseous species, such that a gas, i.e., rich hydrogen gas passing through the wash column will emerge as a purer hydrogen with respect to the gaseous species. Using the absorption column, the vapor flowing upward relative to the liquid downward achieves separation of a volatile component such as hydrogen, while certain impurities become progressively depleted from the vapor as it flows upwards.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

The process of this invention is directed to a process for at least producing ammonia synthesis gas and recovering argon in conjunction with a low purity oxygen plant. A first step is the separation of an oxygen-containing gas, i.e., air, in a low purity oxygen plant to provide low purity oxygen for various partial oxidation of natural gas, a hydrocarbon oil, or coal to produce hydrogen-rich, argon-containing gas. Also separated from the oxygen plant is nitrogen, which may be in at least two phases, for treatment in a nitrogen wash unit. Hydrogen-rich, argon-containing gas passes through the nitrogen wash unit such that at least ammonia synthesis gas is produced and argon is recovered.

Figure 1:
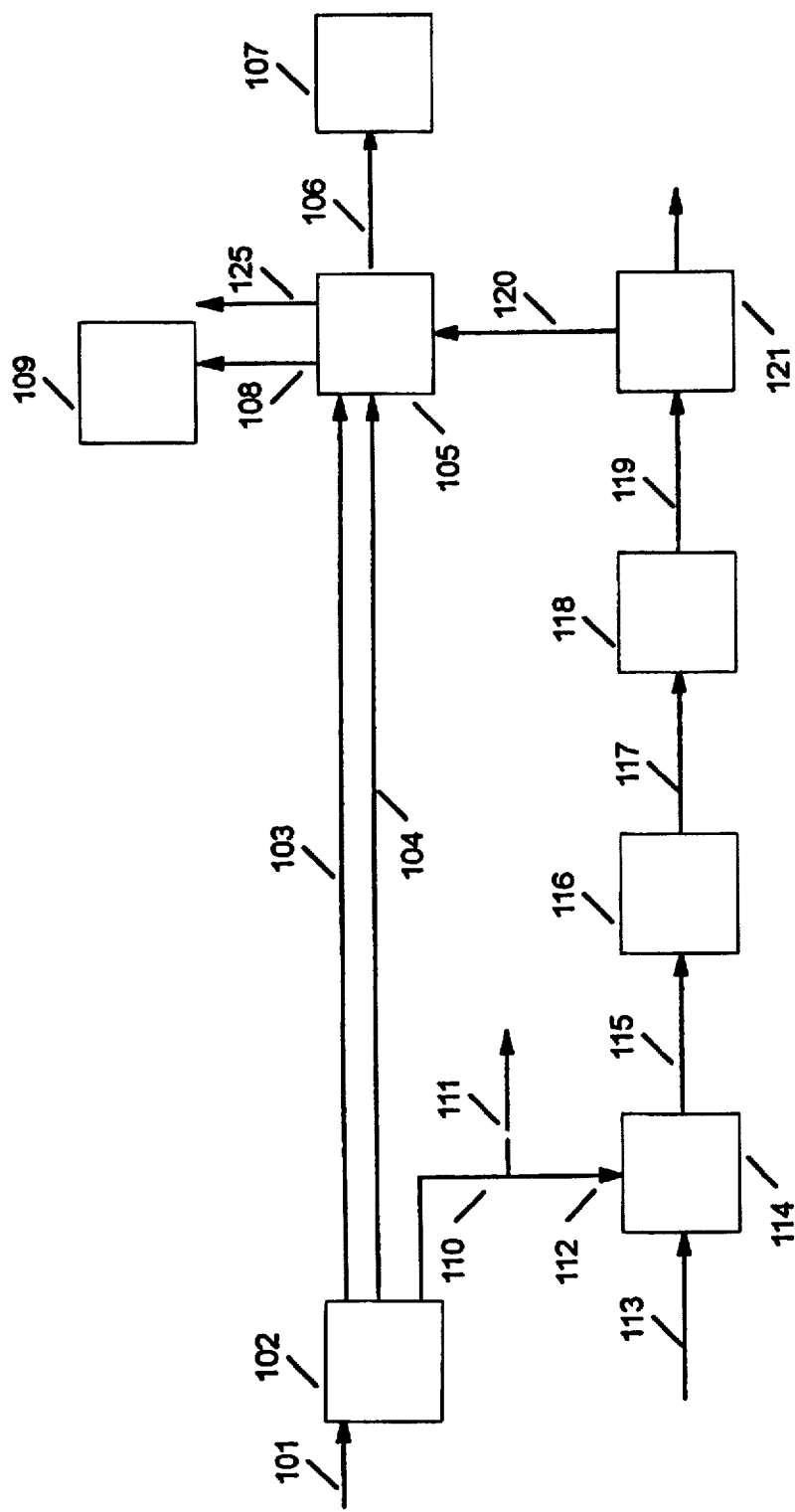
FIG. 1 is a schematic flow diagram of an embodiment of the invention wherein an oxygen-containing gas is fed to a separating unit, a low purity oxygen product from the separating unit is used to partially oxidize a carbonaceous feed stock, producing a hydrogen-rich, argon-containing gas which is passed through a nitrogen wash design with an integrated argon recovery.

FIG. 1 illustrates the process wherein a low purity oxygen from a separating unit is utilized to partially oxidize a carbonaceous feed stock, producing a hydrogen-rich, argon-containing gas which undergoes subsequent treatment in a nitrogen wash unit, from which both ammonia synthesis gas and argon are recovered.

Referring to FIG. 1, oxygen-containing gas 101, generally air, is fed into low purity oxygen plant 102 to provide oxygen 110 for coal gasification unit 114 through oxygen stream 112. Another portion of oxygen stream 110, splitting into oxygen stream 111, may be passed to other oxygen requirements. Alternatively, natural gas, a liquid hydrocarbon, petroleum coke, etc., may replace coal as the feed stock which undergoes partial oxidation in unit 114. Coal 113 is fed into coal gasification unit 114. The raw synthesis gas 115 leaving gasification system 114 contains water, carbon monoxide, hydrogen, carbon dioxide and small quantities of other constituents like hydrogen sulfide, argon and methane. Raw synthesis gas 115 enters carbon monoxide shift unit 116 which converts carbon monoxide and water vapor into hydrogen and carbon dioxide. Gas 117 emerging from shift converter 116 is cooled prior to entering acid gas system comprising unit 118 (for hydrogen sulfide and bulk carbon dioxide removal), emerging as gas 119, and then entering unit 121 (for removal of carbon dioxide to levels acceptable for cryogenic processing). The preferred acid gas system is the type that is capable of reducing the carbon dioxide of the synthesis gas to less than 0.1 mol % (based on systems including amine, hot potassium carbonate and methanol). The gas leaving the bulk carbon dioxide removal portion of the acid gas system is passed to a prepurifier to remove water and carbon dioxide to levels that are acceptable for processing synthesis gas 120 at cryogenic temperatures (~0.1 ppm). Synthesis gas 120 enters the nitrogen wash unit 105 wherein the nitrogen obtained from the oxygen plant is used to wash the argon, carbon monoxide, and methane from the synthesis gas while providing the additional nitrogen needed to adjust the hydrogen-nitrogen ratio used in the ammonia synthesis loop. Spent wash liquid is distilled to recover argon product 125. Liquid nitrogen 104 is obtained from oxygen plant 102 to provide refrigeration. Nitrogen 103 is also passed from oxygen plant 102 to nitrogen wash unit 105. Among other gases, fuel gas 108 is separated from nitrogen wash unit 105 and may optionally be passed to power plant 109. Synthesis gas 106 emerging from nitrogen wash unit 105 is passed to ammonia plant 107 for processing.

Figure 2:
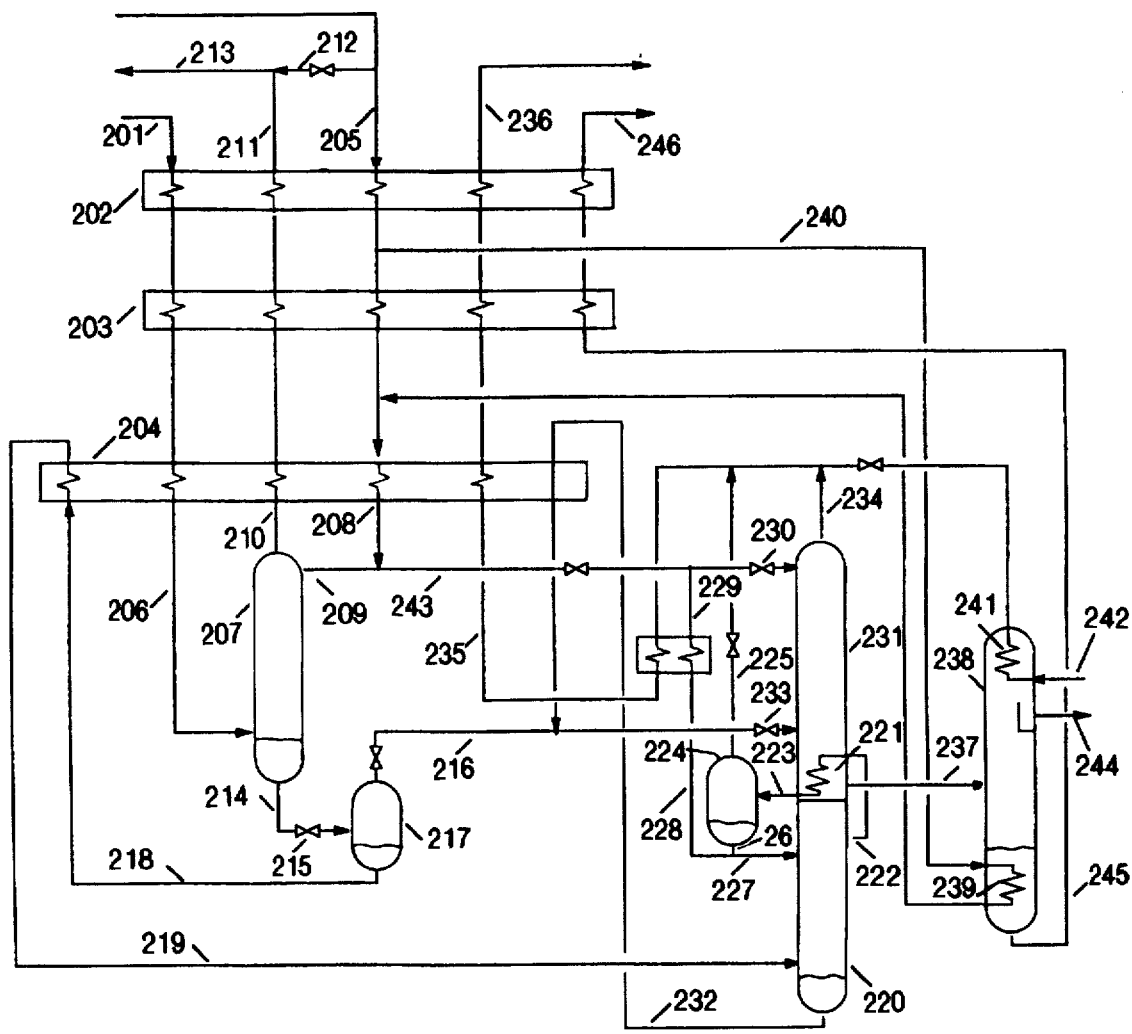
FIG. 2 is a schematic flow diagram of one preferred embodiment of the process of the invention wherein two sources of nitrogen are passed from the low purity oxygen plant to the nitrogen wash unit to at least produce ammonia and separate argon gas.

FIG. 2 illustrates one example of the process of this invention for the separation of nitrogen synthesis gas and the recovery of argon.

Referring now to FIG. 2, the prepurified feed gas 201 is typically at a pressure between 700 and 1000 psig. The stream is cooled from ambient temperature to approximately its dewpoint, by indirect heat exchange with warming product streams in heat exchangers 202, 203 and 204. A gaseous nitrogen stream 205, which has been supplied from an air separation plant and compressed to approximately the same pressure as the feed stream, is cooled and liquefied, preferably in the same heat exchangers as the feed stream.

The hydrogen-rich feed 206, which may contain a small fraction of liquid, is supplied to the bottom of wash column 207. At least a major fraction of the liquefied nitrogen stream 208 is supplied to the top of the wash column as stream 209. The liquid flows down through the trays or packing within the wash column, in countercurrent contact with the rising vapor stream, with the result that the carbon monoxide, argon and methane contaminants in the feed stream are absorbed into the descending wash liquid. The equilibrium conditions within the column are such that a significant amount of nitrogen is vaporized as it contacts the hydrogen-rich vapor rising through the column, with the result that an essentially carbon monoxide and methane-free mixed hydrogen and nitrogen vapor stream 210, containing only a low ppm concentration of argon is removed from the top of the column. However, the molar ratio of $H_2:N_2$ typically remains well above the ratio required for ammonia production. The mixed gas is warmed to ambient temperature through heat exchangers 204, 203 and 202. The resultant stream 211 is then blended with a sufficient additional amount of compressed gaseous nitrogen from the air separation plant, stream 212, to bring it to the desired 3:1 $H_2:N_2$ ammonia synthesis gas composition. The combined stream 213 is then exported to the ammonia plant.

Spent wash liquid 214, comprising nitrogen, carbon monoxide, argon and methane, as well as a low percentage concentration of dissolved hydrogen, is removed from the bottom of wash column 207. The stream passes through a valve 215 to reduce its pressure, typically to about 100 psig. resulting in vaporization of a small fraction of the stream. The resultant vapor 216, which comprises most of the previously dissolved hydrogen, is preferably separated from the remainder of the stream by phase separator 217. The residual liquid 218 is warmed and preferably completely vaporized in cold leg 204 of the feed heat exchangers, before being supplied as stream 219 to higher pressure column 220, of a thermally-linked double column system.

The stream rises through trays or packing within column 220, in countercurrent contact with liquid reflux, which is produced by a condenser heat exchanger 221 at the top of column 220. The resultant rectification within the column effects a partial separation between the more volatile residual hydrogen, nitrogen and carbon monoxide, and the less volatile argon and methane constituents in stream 219. As a result, the fluids at the top of this column are essentially free of both argon and methane. The vapor stream 222 is partially condensed in the reboiler-condenser heat exchanger arrangement 221 which links the higher pressure and lower pressure components of the double column. The resultant stream 223 is then separated in phase separator 224 into a hydrogen-enriched vapor fraction 225, and a mixed nitrogen and carbon monoxide liquid stream 226. Vapor 225 is removed and combined into a lights gas mixture, which will be later described. The liquid stream 226 is split into two fractions, one of which 227 is supplied as reflux to higher pressure column 220. The other liquid fraction 228 is subcooled in indirect heat exchange with a cold vapor stream in heat exchanger 229 prior to being passed through valve 230 and supplied as reflux to lower pressure column 231 of the double column system. It is advantageous to supplement the amount of reflux available to column 231 with a fraction 243 of condensed nitrogen stream 208, prior to supplying the remainder of stream 208 as wash liquid 209 to wash column 210.

Liquid 232, which has been somewhat enriched in argon and methane, is removed from the bottom of higher pressure column 220, and subcooled by indirect heat transfer with one or more cold product streams, for example in heat exchanger 204, before being passed through valve 233 and supplied as feed to the midsection of lower pressure column 231. It is also advantageous to supply hydrogen-rich vapor stream 216 which had been removed from the spent wash liquid in the first separator 217 as an additional feed to lower pressure column 231. Distillation within the upper and lower sections of column 231 is driven by the aforementioned reflux 229 supplied from higher pressure column 220, and boilup from reboiler-condenser heat exchanger 221. This effects further separation between hydrogen, nitrogen and carbon monoxide from the less volatile argon and methane. The lighter gases are removed from the top of the column as stream 234, which is combined with the hydrogen-rich vapor 225, to form stream 235. Stream 235 is warmed in subcooler exchanger 229, and then further warmed to ambient temperature in feed heat exchangers 204, 203 and 202, before being removed as stream 236 from the overall system.

A liquid stream 237, comprising an essentially hydrogen, nitrogen and carbon monoxide-free argon and methane mixture, is removed from the bottom of lower pressure column 231, and supplied as feed to the midsection of an argon-methane separation column 238. Column 238 is driven by heat input to reboiler 239 by fraction 240 of the condensing high pressure nitrogen stream, and by heat removal from the condenser 241 by vaporization of the externally supplied liquid nitrogen stream 242 which provides the overall refrigeration requirements of the cryogenic separation system. The liquid feed to the argon-methane column is distilled within this column to provide an essentially pure argon fraction, which is removed as a liquid product 244 from the top of column 238, and a methane-rich liquid fraction 245, which is removed from the bottom of column 238. Stream 245 is then vaporized and warmed to ambient temperature in the feed heat exchangers 203 and 202, prior to being removed from the overall system as stream 246.

Now, by the use of the process of this invention, one can efficiently and effectively recover at least synthesis gas and argon in conjunction with a low purity oxygen gas. The present process uses a low purity oxygen plant (90–95% $O_2$) which requires about 85% of the power required by the high purity plant to produce oxygen for the gasification system. In a gasification system, the reaction between coal and oxygen generates a relatively small amount of hydrogen and a larger amount of carbon monoxide. The carbon monoxide is subsequently reacted with steam to generate more hydrogen and carbon dioxide. This reaction is generally called the water gas shift. The carbon dioxide is then removed from the gas by scrubbing or other means. Other carbonaceous materials undergo similar reactions, with the difference that a relatively larger amount of hydrogen and less carbon monoxide is generated in the initial partial oxidation step. The difference is due to the fact that the ultimate analysis of coal has a much lower hydrogen to carbon ratio than that of hydrocarbons. Argon is recovered from the system before the nitrogen-hydrogen mixture enters the ammonia synthesis loop and economic credits are provided to this nitrogen wash design based on the amount of argon recovered. In general, the argon nitrogen separation in the nitrogen wash unit is easier then the argon-oxygen-nitrogen separation in the air separation unit.

The most difficult separation associated with argon recovery from the nitrogen wash unit is that between carbon monoxide and argon. Although it is impractical to drive this separation with a heat pump, it can be accomplished with only a small incremental energy consumption relative to a non-argon recovery case, by utilizing a double column arrangement. The bottom liquid from the wash column is flashed and totally vaporized against the feed at a pressure of about 100 psig. This provides a sufficiently high pressure all vapor feed to a higher pressure column of the double column system to generate the reflux needed for both the higher and lower pressure columns to effect carbon monoxide and argon separation without an auxiliary drive.

In addition, flash vaporization of part of the high pressure liquid nitrogen into the hydrogen-rich synthesis gas within the wash column provides a heat pumping effect of considerable magnitude, which is an inherent but normally wasted feature of the nitrogen wash process. This effect can be increased without incurring any significant penalty by operating the top of the wash column at a higher than conventional temperature, and introducing a higher than normal percentage of the required nitrogen to the synthesis gas stream at this point. It is then utilized in the invented process to raise the recovery of refined argon above 95%.

As shown in the following Table I, the present invention using a low purity oxygen plant requires less power consumption and lower capital cost, while generating essentially the same rate of oxygen production and argon recovery.

TABLE I comparison of the existing art and the present invention

| | Existing art | Present invention |
|---|---|---|
| oxygen rate, t/d contained | 2,640 | 2,640 |
| oxygen purity, mol % | 99.5 | 95 |
| power, MW | 55.1 | 49.3 |
| argon, t/d | 90 | 90 |
| delta capital cost, % | base | 85–95% of base |

Specific features of the invention are shown in one or more of the drawings for convenience only, as each feature may be combined with other features in accordance with the invention. For example, although FIG. 1 shows an acid gas system that takes the carbon dioxide content to less than 0.1 mol %, alternative systems could be used that reduce the carbon dioxide content to about 5 mol % followed by a pressure swing adsorption system to remove carbon dioxide to levels acceptable for processing in the cryogenic wash unit of greater than 0.1 ppm. Alternative embodiments will be recognized by those skilled in the art and are intended to be included within the scope of the claims.

What is claimed is:

1. A process for producing ammonia synthesis gas and recovering argon in conjunction with a low purity oxygen separating unit, said process comprising:
   (a) providing a feed gas comprising at least oxygen, nitrogen and argon into said separating unit to separate said feed gas into at least a low-purity oxygen gas and nitrogen;
   (b) passing said nitrogen into a wash unit comprising a wash column and at least one cryogenic fractional distillation column;
   (c) washing a hydrogen-rich, argon-containing gas with at least a portion of said nitrogen in said wash column to produce a rich hydrogen-nitrogen mixture and an argon-containing residual liquid;
   (d) combining said rich hydrogen-nitrogen mixture with another portion of said nitrogen gas to produce ammonia synthesis gas;
   (e) passing said residual liquid into at least one of said distillation column; and
   (f) recovering argon from said distillation column.

2. The process of claim 1 wherein said low purity oxygen contains about 50 to 99% oxygen.

3. The process of claim 2 wherein said low purity oxygen contains about 90 to 95% oxygen.

4. The process of claim 1 further wherein said low purity oxygen is used for partial oxidation of natural gas, a hydrocarbon oil, or coal to produce said hydrogen-rich, argon-containing gas.

5. The process of claim 1 wherein said hydrogen-rich, argon-containing gas contains from about 80 to 98% hydrogen.

6. The process of claim 1 wherein said wash unit comprises at least one phase separator and at least one fractional distillation column.

7. The process of claim 1 wherein each of said hydrogen-rich, argon-containing gas and nitrogen is cooled by indirect heat exchange prior to passing into said wash column.

8. The process of claim 1 further comprising recovering at least some low boiling point gases and at least some methane.

9. The process of claim 1 wherein at least some of the upflowing vapor in said wash column comprise hydrogen and nitrogen vapors.

10. The process of claim 1 wherein a portion of said nitrogen is cooled by indirect heat exchange and used as liquid reflux for at least one fractional distillation column.

11. The process of claim 1 wherein said residual liquid is separated into a liquid phase and a vapor phase prior to passing into at least one of said distillation column.

12. The process of claim 1 wherein an enriched argon-methane mixture recovered from at least one of said distillation column is passed through another distillation column to at least recover argon.

13. The process of claim 12 wherein a portion of said nitrogen gas is employed to reboil another distillation column.

14. The process of claim 1 wherein a thermally-linked double column arrangement is utilized to separate low boiling point gases from said enriched argon-methane mixture.

15. A process for producing ammonia synthesis gas and recovering argon in a wash unit, said process comprising:
   (a) passing nitrogen into said wash unit comprising a wash column and at least one cryogenic fractional distillation column;
   (b) washing a hydrogen-rich, argon-containing gas with said nitrogen in said wash column to produce a rich hydrogen-nitrogen mixture and an argon-containing residual liquid;
   (c) combining said rich hydrogen-nitrogen mixture with another portion of said nitrogen gas to produce ammonia synthesis gas;
   (d) passing said residual liquid into at least one of said distillation column; and
   (e) recovering argon from said distillation column.

16. The process of claim 15 wherein each of said hydrogen-rich, argon-containing gas and nitrogen is cooled by indirect heat exchange prior to passing into said wash column.

17. The process of claim 15 wherein said residual liquid is separated into a liquid phase and a vapor phase prior to passing into at least one of said distillation column.

18. The process of claim 15 wherein an enriched argon-methane mixture recovered from at least one of said distillation column is passed through another distillation column to at least recover argon.

19. The process of claim 15 wherein a portion of said nitrogen is employed to reboil another distillation column.

20. The process of claim 15 wherein a thermally-linked double column arrangement is utilized to separate low boiling point gases from said enriched argon-methane mixture.

* * * * *